June 19, 1962    H. VAN DER ESCH    3,039,307
OIL METER FOR USE WITH A CENTRAL OIL DISTRIBUTING SYSTEM
Filed Aug. 24, 1959
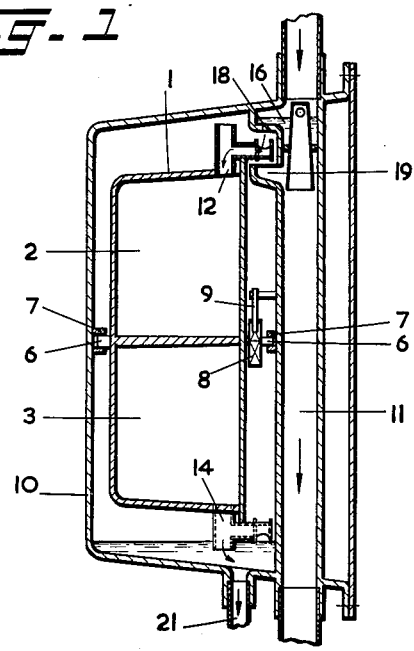
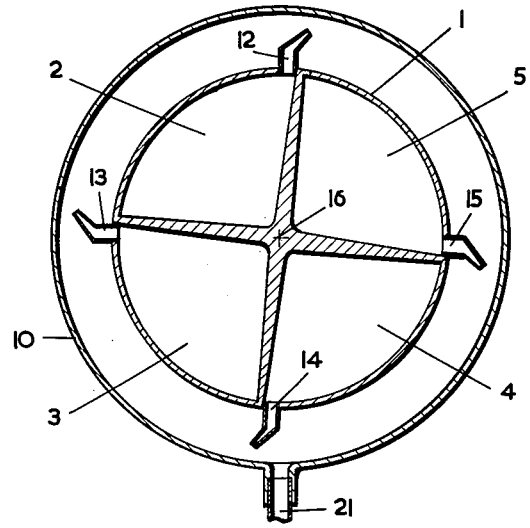
INVENTOR.
HENRI VAN DER ESCH
BY Wenderoth, Lind & Ponack
Attys.

United States Patent Office 3,039,307
Patented June 19, 1962

3,039,307
OIL METER FOR USE WITH A CENTRAL OIL DISTRIBUTING SYSTEM
Henri van der Esch, The Hague, Netherlands, assignor to N.V. Davo Haardenfabriek, Deventer, Netherlands, a corporation of the Netherlands
Filed Aug. 24, 1959, Ser. No. 835,575
Claims priority, application Netherlands Sept. 8, 1958
6 Claims. (Cl. 73—217)

This invention relates to an oil meter for use in a system of oil distributing, in which the oil flows from the oil supply conduit to the meter without any pressure being exerted thereon, while superfluous oil which is not taken up by the meter immediately flows back again into the system via an overflow.

The meter is a so-called partitioned rotor type meter, comprising a rotor which has been so partitioned that 4 compartments are formed therein, one of which is in the filling position, the second in filled, the third being in the discharging position so that it gradually empties itself in accordance with the principle of Mariotte's bottle according as oil is consumed, the oil flowing into a collecting reservoir in which a constant oil level is maintained, the fourth compartment likewise emptying into the collecting reservoir after rotation of the rotor, in so far as said fourth compartment still contains oil.

A preferred embodiment of the invention is illustrated in the accompanying drawing, in which:

FIG. 1 is an elevational sectional view of a meter according to the present invention; and FIG. 2 is a sectional view of the meter of FIG. 1 taken on line 2—2 of FIG. 1.

The invention will now be further elucidated with reference to the accompanying drawing in which the reference numeral 1 designates the rotor partitioned into four measuring compartments 2, 3, 4 and 5, said rotor being journalled in bearings 6, 7, in the housing of the meter, which at the same time forms the collecting reservoir 10 having outlet 21.

The rotor has a single access conduit 12, 13, 14 and 15 for each of the compartments. Each access conduit comprises a radially extending pipe 12a, 13a, 14a and 15a, and a branch pipe 12b, 13b, 14b and 15b. Each branch pipe has an opening 12c, 13c, 14c and 15c at the end thereof which, when the compartment to which it gives access is in the uppermost position is beneath the casing inlet 16. In this position it interrupts the flow of liquid to the overflow outlet 19, which is below and spaced from inlet 16, diverting it into the rotor compartment. When the compartment is full, the opening being above the level of the top of the compartment, liquid overflows into the overflow outlet 19. Inlet 16 and overflow 19 are connected to a liquid supply conduit 11.

After rotation of the rotor so that a filled compartment has been moved to the position 3 the compartment remains filled. Upon rotation of the rotor so that the filled compartment is moved to the position 4 the filling opening 12, 13, 14, 15 is located below the constant level of the reservoir 10 compartment 4 will empty then in accordance with Mariotte's principle according as oil is taken off via conduit 21. Thus the equilibrium is distributed, which equilibrium on the one hand existed between the weight of the oil in compartments 2 and 3 and on the other hand the oil in compartment 4 and the moment exerted by the action of spring 9 on the square 8 secured to shaft 6. Due to the rotation of the rotor which occurs after the compartment at position 4 is emptied, this comparment will arrive in position 5, in which position residual oil still contained in the compartment will drain therefrom through the access conduit which is positioned adjacent the rear wall of the compartment.

Shaft 6 is connected with a counting mechanism (not shown) which will record the movement of a filled compartment.

I claim:

1. A meter for measuring fluid flow, comprising a housing having a liquid outlet in the bottom thereof and a liquid inlet at the top thereof, and an overflow conduit in said housing having one end immediately below and spaced from said liquid inlet, a rotor rotatably mounted in said housing for rotation with one portion of said rotor at one point in the rotation thereof being higher than the remainder of the rotor, said rotor having a plurality of compartments therein each forming a sector of the rotor, each compartment having a single access conduit serving as an inlet and outlet therefor and extending both upwardly of said rotor and laterally from said rotor to a position beneath said inlet to the casing when the compartments are at the top of the rotor, said conduit having an overflow edge which, when the conduit is at the top of the rotor, is over the one end of the overflow conduit and is lower than the uppermost part of the conduit for permitting overflow of excess liquid only after the uppermost compartment is filled, and means engaged with said rotor for limiting the rotation of the rotor to a stepwise rotation when a compartment in the lower position on the rotor is substantially empty, and a counter connected to said rotor for counting the movements thereof.

2. A meter as claimed in claim 1 in which said rotor is rotatable about a horizontal axis.

3. A meter as claimed in claim 1 in which said access conduits each comprise a pipe extending substantially radially outwardly of the rotor, and a branch pipe extending horizontally from said radially extending pipe and having an opening in the peripheral portion thereof adjacent the end thereof, said branch pipe extending between the inlet and overflow from the casing when said rotor is positioned with an access conduit at the top of said casing, said opening in said branch pipe being positioned beneath the inlet to the casing and being above the level of the top of the compartment at the top of the rotor and forming said overflow edge.

4. A meter as claimed in claim 3 in which said access conduit is adjacent the wall which, in the sense of the direction of rotation of the rotor, is at the rear of the compartment.

5. A meter as claimed in claim 1 in which there are four equal compartments in said rotor and said means for limiting rotation of said rotor comprises a resilient member and a square member on the axis of said rotor with which said resilient member is engaged.

6. A meter for measuring fluid flow, comprising a housing having a liquid outlet in the bottom thereof and a liquid inlet at the top thereof, and an overflow conduit in said housing having one end immediately below and spaced from said liquid inlet, a rotor rotatably mounted in said housing for rotation with one portion of said rotor at one point in the rotation thereof being higher than the remainder of the rotor, said rotor having a plurality of compartments therein each forming a sector of the rotor, each compartment having a single access conduit serving as an inlet and outlet therefor and extending both upwardly of said rotor and laterally from said rotor to a position beneath said inlet to the casing when the compartments are at the top of the rotor, said conduit having an overflow edge which, when the conduit is at the top of the rotor, is over the one end of the overflow conduit and is lower than the uppermost part of the conduit for permitting overflow of excess liquid only after the uppermost compartment is filled, and means engaged with said rotor for limiting the rotation of the rotor to a stepwise rotation when a compartment in the lower position on the rotor is substantially empty.

References Cited in the file of this patent

UNITED STATES PATENTS 1,387,701     Gardiner  ---------------- Aug. 16, 1921